Patented Oct. 29, 1929

1,733,768

UNITED STATES PATENT OFFICE

ALOIS ZINKE, OF GRAZ, STYRIA, AUSTRIA, ASSIGNOR TO FELICE BENSA, OF GENOA, ITALY

PROCESS OF CONDENSING ORGANIC COMPOUNDS BY MEANS OF ALUMINUM CHLORIDE

No Drawing. Application filed April 7, 1925, Serial No. 21,325, and in Austria April 10, 1924.

It has been discovered that by the addition of oxidizing agents such as manganese dioxide, ferric oxide, ferric chloride, copper oxide, potassium nitrate, nickel sulphate and the like to condensing charges containing aluminum chloride, the condensing reaction may be materially affected. The final product may be obtained in greater purity and with a greater output and in some cases even products of a different nature may be obtained. Vat dyes obtained by the present process differ from those obtained by condensation with aluminum chloride alone in that a vat may be obtained from them more readily. In general up to 100 parts by weight of the oxidizing agent are used per 100 parts by weight of the organic compound to be treated.

The following is a description of various examples of carrying into practice the present process.

Example I

One part by weight of dibenzoyl perylene to be condensed by aluminum chloride in the customary way is mixed with four parts by weight of aluminum chloride to which one part by weight of manganese dioxide preferably in the form of pyrolusite is added. The dark powder obtained by treating the mass resulting from the condensation with dilute hydrochloric acid may be converted into a vat without the addition of alcohol and is identical with the product obtained by the use of aluminum chloride alone, namely isoviolanthrone, but the output is about 30 to 50% while without the addition of manganese dioxide it is only 10 to 15%.

The reaction is illustrated by the following equation:

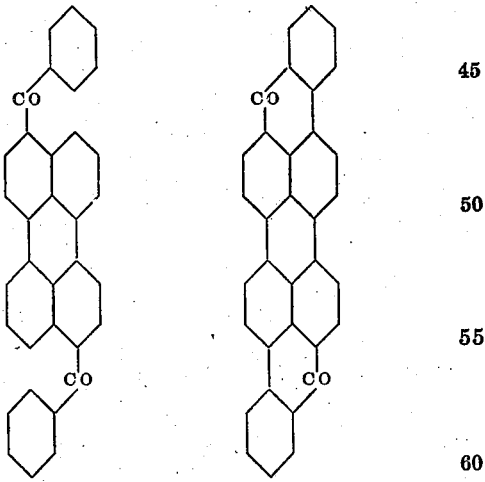

Dibenzoyl Perylene    Isoviolanthrone

Example II

By the addition of one part by weight of manganese dioxide to the charge consisting of one part by weight of perylene, 2 parts by weight of benzoylchloride and five parts by weight of aluminum chloride and condensing the mixture in the customary way by heating to 140-160° centigrade and treating with dilute hydrochloric acid the same product is obtained as without the use of manganese dioxide but the output is increased from 10% in the one case to 60% in the other case.

The formulæ of the starting materials are well known, but the constitutional formula of the final product could not be ascertained up to now, the final product possibly being identical with isoviolanthrone.

Example III

By adding to a charge consisting of one part by weight of perylene, two parts by weight of benzoic acid and five parts by weight of aluminum chloride one part by weight of ferric chloride and condensing in the customary way the same product is obtained as without the addition of ferric chloride, but the output is increased from 5% in the one case to 25% in the other case.

The formulæ of the starting materials are well known but the constitutional formula of the final product could not be ascertained up to now.

Example IV

By adding to a charge consisting of one part by weight of dibenzoyl dioxy perylene and a suitable quantity of aluminum chloride one part by weight of manganese dioxide and condensing in the usual way a product is obtained which differs from that resulting from the condensation without the use of manganese dioxide inasmuch as it dissolves in concentrated sulphuric acid with a wine red colour and gives a green vat in which cotton is dyed green.

The constitutional formula of the dibenzoyldioxyperylene is as follows:—

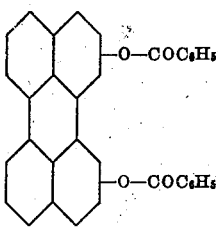

The constitutional formula of the final product could not be ascertained up to now.

Example V

It has already been proposed to manufacture vat dyes by condensing perylene derivatives with derivatives of aromatic acids and aluminum chloride. If according to this known process perylene dibromide of a melting temperature of 222 to 224° centigrade and benzoyl chloride are condensed by means of aluminum chloride, a substance is obtained which dissolves in sulphuric acid with a green colour, gives a blue vat and dyes cotton bluish violet. If now to this charge manganese dioxide is added, the latter and the perylene dibromide being equal in weight and the whole is condensed, a substance is obtained which dissolves in sulphuric acid with a steel blue colour, gives a blue vat and dyes cotton violet blue.

If, however, for one part by weight of perylene dibromide five parts by weight of manganese dioxide are used in this case, the product obtained by the condensation dissolves in concentrated sulphuric acid with a bluish violet colour, gives a brownish red vat and dyes cotton red.

The empiric formula of perylene dibromide is $C_{20}H_{10}Br_2$; the constitutional formula of the same as well as that of the final products could not be ascertained up to now.

Example VI

By condensing 3, 9 dichloro perylene of the melting temperature of 260° centigrade with benzoyl chloride by means of aluminum chloride in the usual manner, a substance giving a blue vat and dying cotton violet, is obtained, but if manganese dioxide is added to the above charge before condensation different vat dyes are obtained. Thus a condensation of two hours duration furnishes a substance giving a cherry red vat dyeing cotton lilac, a condensation of three hours duration furnished a dye dyeing cotton cardinal red and a condensation of four hours duration furnishes a vat dye dyeing cotton violet. On adding in the same process five parts of manganese dioxide per one part of 3, 9 dichloro perylene a substance is obtained giving a brick red dye dyeing cotton in flesh colour.

The constitutional formulæ of the final products could not be ascertained up to now.

Example VII

By condensing tetrachloride of perylene of a melting temperature 242° centigrade with benzoyl chloride and aluminum chloride a substance giving a blue vat and dyeing cotton blue with a violet tinge is obtained. If, however, five parts by weight of manganese dioxide are added per one part by weight of tetrachloride a substance is obtained which gives a violet vat and dyes cotton in a pure rose colour and dissolves in concentrated sulphuric acid with a blue violet colour. On adding 0.5 parts by weight of nickel sulphate instead of the manganese dioxide a substance is obtained which dyes cotton violet with a blue tinge.

The empiric formula of the tetrachloride of perylene is $C_{20}H_8Cl_4$; its constitutional formula as well as the constitutional formulæ of the final products could not be ascertained up to now.

While in some cases as in Examples I, II, III, and IV, the addition of an oxidizing agent to the aluminum chloride does not result in changing the nature of the final condensation product, such changes do occur in some cases, as in Examples V, VI, and VII. The results of the condensation with aluminum chloride alone have been referred to hereinbefore for more clearly pointing out the difference between this known condensation method and the present method. The constitional formulæ of the final products obtained by means of aluminum chloride alone could not be ascertained up to now except in the case of Example I and possibly Example II.

What is claimed is:

1. A process for condensing perylene substitution compounds, in which each of the substituents is combined with the perylene nucleus in one position of the latter only, by means of aluminum chloride, consisting in adding to such aluminum chloride before the condensation an oxidizing agent solid at room temperature and then proceeding with the condensation.

2. A process for condensing perylene substitution compound, in which each of the substituents is combined with the perylene nucleus in one position of the latter only, by means of aluminum chloride, consisting in adding to such aluminum chloride before the condensation an oxidizing agent solid at room temperature and benzoyl chloride and then proceeding with the condensation.

In testimony whereof I have affixed my signature.

ALOIS ZINKE.